Feb. 2, 1971 C. A. BORROWMAN 3,559,371
DEVICE FOR LOADING STACKED EGGS INTO AN EGG CARTON
Filed Sept. 23, 1968

INVENTOR
CHARLES A. BORROWMAN
BY
Zarley, McKee & Thomte
ATTORNEYS

United States Patent Office 3,559,371
Patented Feb. 2, 1971

3,559,371
DEVICE FOR LOADING STACKED EGGS INTO AN EGG CARTON
Charles A. Borrowman, Griggsville, Ill. 62340
Filed Sept. 23, 1968, Ser. No. 761,545
Int. Cl. B65b 67/02
U.S. Cl. 53—390                     3 Claims

ABSTRACT OF THE DISCLOSURE

A device for loading a plurality of stacked egg flats into an egg carton including an upper frame means having four rotatable legs extending downwardly therefrom adapted to receive the egg flats therebetween. A handle means is provided on the frame means and is operatively interconnected with the legs by a linkage means to permit the handle means to rotate the legs from a first position to a second position. Each of the legs have a foot member extending transversely therefrom at the lower end thereof. The foot members are adapted to extend beneath the lowermost egg flat to support the stacked egg flats when the legs are in said first position. When the legs are rotated to said second position, the foot members are moved out of engagement with the egg flats to permit the frame means and the legs to be raised with respect to the egg flats.

---

The conventional egg case or carton normally has approximately six or more tiers of egg trays or flats therein. It is extremely difficult to place the flats in the case because the flat must coincide with the inner configuration of the case. In other words, the dimensions of the flats are approximately the same as the inside dimensions of the egg carton to limit the movement of the flats when positioned in the carton. Thus, the egg flats must be placed in the carton in an extremely time-consuming and inconvenient operation which is difficult at best.

Therefore, it is a principal object of this invention to provide a device for loading a plurality of stacked egg flats into an egg carton.

A further object of this invention is to provide a device for handling a plurality of stacked egg flats.

A further object of this invention is to provide a device for loading a plurality of stacked egg flats into an egg carton which eliminates breakage problems.

A further object of this invention is to provide a device for loading a plurality of stacked egg flats into an egg carton which is convenient to use.

A further object of this invention is to provide a device for loading a plurality of stacked egg flats into an egg carton which greatly reduces the amount of time required for such an operation.

A further object of this invention is to provide a device for loading a plurality of stacked egg flats into an egg carton or case wherein the person need not place his hands inside the carton.

A further object of this invention is to provide a device for loading a plurality of stacked egg flats which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

The numeral 10 generally designates a conventional egg carton or case adapted to accommodate a plurality of stacked egg flats 12 therein. The egg flats are of conventional design and are adapted to support a plurality of eggs 14 thereon which are usually 30 in number.

Figure 3:
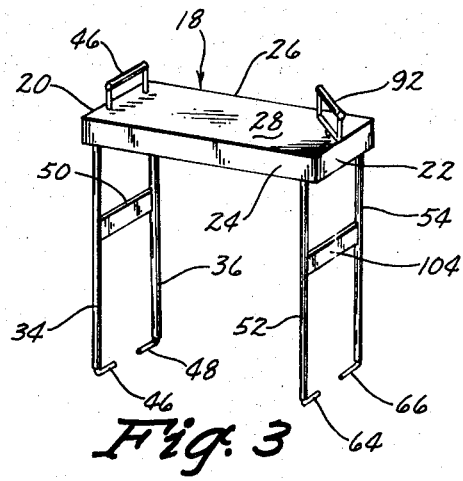
FIG. 3 is a perspective view of the device similar to FIG. 1, except that the rotatable legs have been rotated to a second position.
Figure 5:
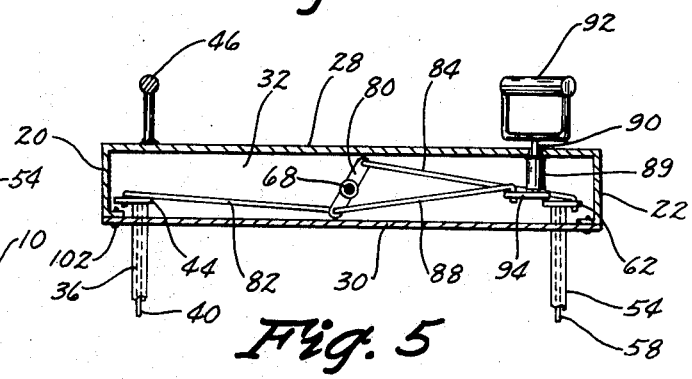
FIG. 5 is a sectional view as seen along lines 5—5 of FIG. 4.

The numeral 16 generally designates the device of this invention and includes an upper frame means 18 having opposite ends 20 and 22, opposite sides 24 and 26, top 28 and bottom 30. As seen in FIG. 5, the frame means 18 is designed so as to provide a compartment 32 therein between top 28 and bottom 30. A pair of hollow tubes 34 and 36 extend through bottom 30 adjacent end 20 and are secured to bottom 30 by any convenient means such as welding or the like. Legs 38 and 40 are rotatably mounted in tubes 34 and 36 respectively and have arm members 42 and 44 secured to the upper ends thereof respectively by any convenient means such as welding or the like. Legs 38 and 40 are provided with transversely extending foot portions 46 and 48 respectively. As seen in FIG. 3, a brace 50 is secured to and extends between tubes 34 and 36 intermediate the links thereof.

A pair of hollow tubes 52 and 54 extend through bottom 30 and are secured thereto by welding or the like adjacent end 22. Legs 56 and 58 are rotatably mounted in tubes 52 and 54 respectively and have arm members 60 and 62 secured to the upper ends thereof respectively by welding or the like. Legs 56 and 58 are provided with transversely extending foot portions 64 and 66 respectively.

Figure 6:
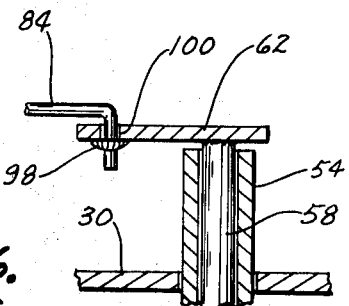
FIG. 6 is a sectional view as seen along lines 6—6 of FIG. 4.
Figure 4:
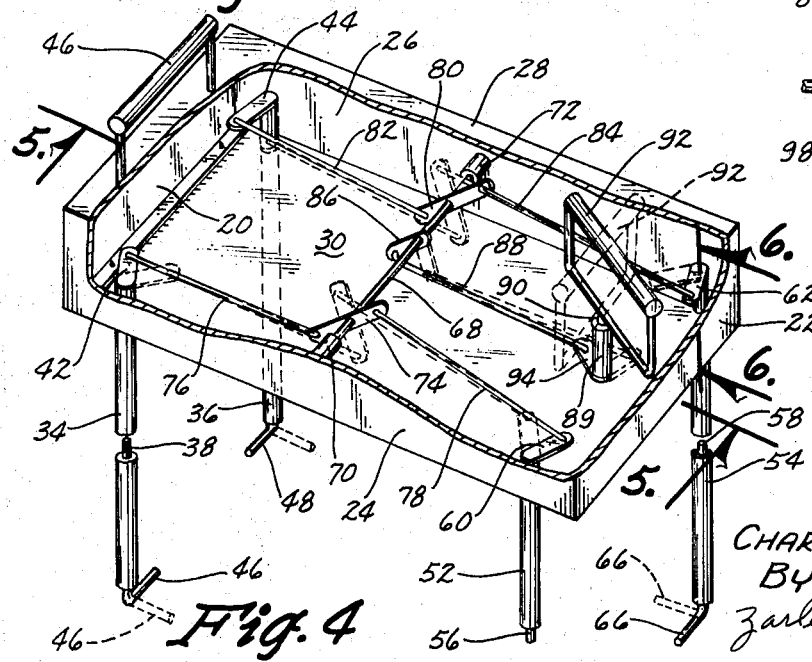
FIG. 4 is a fragmentary top perspective view of the device with portions thereof cut away to more fully illustrate the invention, the broken lines indicating the position of the components when the handle means has been rotated to a second position.

The numeral 68 designates a rocker arm which rotatably extends between sides 24 and 26 of upper frame means 18 within compartment 32 as illustrated in FIG. 4. The opposite ends of rocker arms 68 are rotatably mounted in bearings 70 and 72 respectively which are secured to the inside surfaces of sides 24 and 26 respectively by any convenient means such as welding or the like. A link 74 is rigidly mounted on shaft 68 adjacent bearing 70 and has connecting rods 76 and 78 pivotally connected to opposite ends thereof as illustrated in FIG. 4. Rod 78 is pivotally connected to the outer end of arm member 60 while rod 76 is pivotally connected to the outer end of arm member 42. A link 80 is rigidly connected to shaft 68 adjacent bearing 72 and has connecting rods 82 and 84 pivotally connected to opposite ends thereof. Rod 84 is pivotally connected to the upper end of arm member 62 while the rod 82 is pivotally connected to the outer end of arm member 44. A link 86 is rigidly connected to shaft 68 between links 74 and 80 and has a connecting rod 88 pivotally secured to an outer end thereof. The numeral 89 designates a bearing which is secured to the underside of top 28 by any convenient means such as welding or the like and which has a shaft 90 rotatably mounted therein which extends upwardly through top 28. A handle 92 is rigidly connected to the upper end of shaft 90 while an arm member 94 is rigidly connected to the lower end of shaft 90 below bearing 88. Rod 88 is pivotally connected to the outer end of arm member 94 as illustrated in FIG. 4. A second handle 46 is secured to upper frame means 18 adjacent end 20 by any convenient means such as welding or the like. FIG. 6 illustrates the manner in which the connecting rods are connected to the various links. As seen in FIG. 6, a spring clip 98 embraces the downwardly extending portion of rod 84 to maintain the rod 84 in the opening 100 formed in the outer end of arm member 62. The bottom 30 is secured to the frame means 18 by any convenient means such as screws 102 or the like to permit the device to be fabricated and to permit possible replacement of parts within compartment 32 if necessary. A brace 104 is secured to and extends between tubes 52 and 54 intermediate the links thereof as illustrated in FIG. 3.

Figure 1:
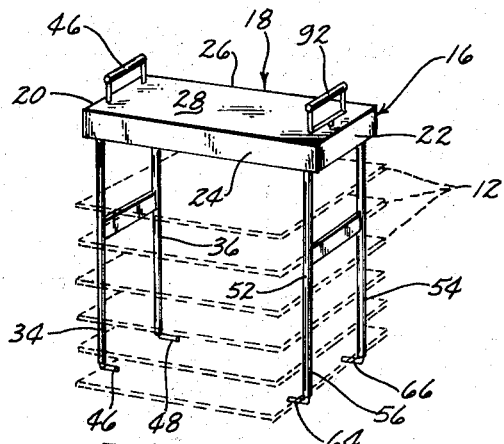
FIG. 1 is a perspective view of the device, the broken lines indicating the manner in which the stacked egg flats are positioned between the legs of the device.
Figure 2:
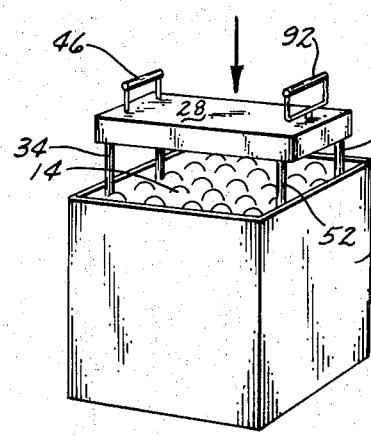
FIG. 2 is a perspective view illustrating the device being used to load a plurality of stacked egg flats into an egg carton.

In operation, the handle 92 is first rotated to a position shown by solid lines in FIG. 4 so that the rod 88 causes shaft 68 to be rotated which in turn causes the rods 76, 82, 78 and 84 to be moved so that the legs 38, 40, 56 and 58 are rotated within their respective tubes to cause the foot portions 46, 48, 64 and 66 to be rotated to the position seen in FIG. 3. The device is then placed over a plurality of egg flats 12 in a manner illustrated in FIG. 1. Handle 92 is then rotated from the position shown in solid lines in FIG. 4 to the position shown by broken lines in FIG. 4. The rotation of the handle 92 to the position illustrated by broken lines in FIG. 4 causes the rotation of the legs from the position illustrated in FIG. 3 to the position illustrated by broken lines in FIG. 4 and by solid lines in FIG. 1. As seen in FIG. 1, the foot portions on lower ends of the legs extend towards each other and extend beneath the lowermost egg flat 12. The handles 96 and 92 are then grasped to lift the device and the egg flats 12 supported thereon. The egg flats 12 are inserted downwardly into the open upper end of the carton as illustrated in FIG. 2 until the lowermost egg flat 12 is positioned at the bottom of the carton 10. Handle 92 is then rotated from the position illustrated in broken lines in FIG. 4 to the position illustrated by solid lines in FIG. 4 so that the foot portions rotate out of engagement with the underside of the lowermost egg flat 12. The device is then lifted from the carton 10 and the plurality of egg flats 12 remain in the carton. It can be appreciated that the device could also be used to remove the egg flats 12 from the carton 10 if so desired. It can be also appreciated that a unique device has been provided for placing a plurality of egg flats 12 into a carton 10 in an efficient and convenient manner. The device described herein not only reduces the time required to fill the carton 10 but also greatly reduces the chance of breakage of the eggs. Thus it can be seen that the device accomplishes at least all of its stated objectives.

Some changes may be made in the construction and arrangement of my Device for Loading Stacked Eggs Into an Egg Carton without departing from the real spirit and purpose of my invention, and it is my intention to cover by my claims, any modified forms of structure or use of mechanical equivalents which may be reasonably included within their scope.

I claim:
1. In a device of the class described,
a frame means having opposite ends,
a first pair of rotatable legs extending downwardly from said frame means adjacent one end thereof,
a second pair of rotatable legs extending downwardly from said frame means adjacent the other end thereof,
said legs each having a transverse foot portion extending from the lower end thereof,
said first and second pairs of legs having a length sufficient so that a plurality of stacked egg flats can be positioned between said frame means and said foot portions,
a handle means on said frame means, and being movable to at least first and second positions,
a linkage means interconnecting said handle means and said legs whereby said handle means can be moved to its first position so that said legs will be rotated to a first position whereby the foot portions on said first pair of legs and the foot portions on said second pair of legs extend inwardly towards each other so that a plurality of stacked egg flats can be supported on said foot portions between said legs, said handle means being movable to a second position whereby said foot portions will be moved to a position whereby said frame means and said legs can be raised with respect to the stacked egg flats.

2. The device of claim 1 wherein each of said legs have an arm member secured to their upper ends, a rocker shaft rotatably mounted on said frame means between said first and second pairs of legs, said shaft having first and second link means secured to its opposite ends, first and second rods connecting said arm members on said first pair of legs with said first and second link means respectively, third and fourth rods connecting said arm members on said second pair of legs with said first and second link means respectively, a link secured to said rocker shaft and a fifth rod connecting said link and said handle means.

3. The device of claim 2 wherein said frame means includes a closed compartment and said linkage means is mounted in said compartment, said legs being rotatably mounted in hollow tubes rigidly secured to said frame means and extending downwardly therefrom.

References Cited

UNITED STATES PATENTS

| | | | |
|---|---|---|---|
| 1,500,939 | 7/1924 | Howell | 294—87A |
| 2,714,523 | 8/1955 | Bliss | 294—87A |
| 2,818,295 | 12/1957 | Bloemendaal | 294—26.5 |

THERON E. CONDON, Primary Examiner

R. L. SPRUILL, Assistant Examiner

U.S. Cl. X.R.

294—86